United States Patent [19]

Albert

[11] Patent Number: 5,452,356

[45] Date of Patent: Sep. 19, 1995

[54] PAGING TRANSMISSION SYSTEM

[75] Inventor: David E. Albert, Oklahoma City, Okla.

[73] Assignee: Data Critical Corp., Oklahoma City, Okla.

[21] Appl. No.: 165,743

[22] Filed: Dec. 10, 1993

Related U.S. Application Data

[63] Continuation-in-part of Ser. No. 15,869, Feb. 10, 1993.

[51] Int. Cl.[6] .............................................. H04L 9/00
[52] U.S. Cl. ......................................... 380/9; 380/29; 380/34; 380/49; 380/50; 340/825.44; 340/825.52; 375/200; 455/33.1; 455/38.1; 455/53.1; 455/54.1; 379/58; 379/59
[58] Field of Search ....................... 375/1; 380/3, 4, 9, 380/18, 23, 25, 34, 49, 50, 29; 128/668, 672, 696, 716, 731, 736; 379/58, 59, 100, 106; 455/33.1, 53.1, 54.1, 38.1; 340/825.44, 825.52

[56] References Cited

U.S. PATENT DOCUMENTS

| | | | |
|---|---|---|---|
| 3,882,277 | 5/1975 | DePedro et al. | 379/106 |
| 4,428,381 | 1/1984 | Hepp | 128/715 |
| 4,449,536 | 5/1984 | Weaver | 128/696 |
| 4,458,693 | 7/1984 | Badzinski et al. | 128/715 |
| 4,531,527 | 7/1985 | Reinhold, Jr. et al. | 128/696 |
| 4,660,032 | 4/1987 | Tsunoda | 340/825.44 |
| 4,791,933 | 12/1988 | Asai et al. | 128/696 X |
| 4,802,222 | 1/1989 | Weaver | 395/2.12 |
| 4,883,064 | 11/1989 | Olson et al. | 128/696 |
| 5,012,411 | 4/1991 | Policastro et al. | 364/413.06 |
| 5,285,496 | 2/1994 | Frank et al. | 380/9 |
| 5,319,355 | 6/1994 | Russek | 455/53.1 X |

OTHER PUBLICATIONS

Paper entitled *A New Data Compression Algorithm for Computerized ECG Signal* by Walter H. Chang & C. D. Kao, IEEE/8th Annual Conference of the Engineering in Medicine and Biology Society, pp. 311–314.

*Primary Examiner*—Bernarr E. Gregory
*Attorney, Agent, or Firm*—Dougherty, Hessin, Beavers & Gilbert

[57] ABSTRACT

Method and apparatus for sending, receiving, and displaying custom coded textual and/or graphic data via an alphanumeric paging system wherein source data in binary form is encrypted with a designated code and then further converted to an alphanumeric code for transmission via the paging system; a paging receiver with storage capability used in combination with a computer then receives the transmitted data and downloads the alphanumeric code data for reconversion and decryption to binary data and subsequent display of the text and/or graphic data.

20 Claims, 11 Drawing Sheets

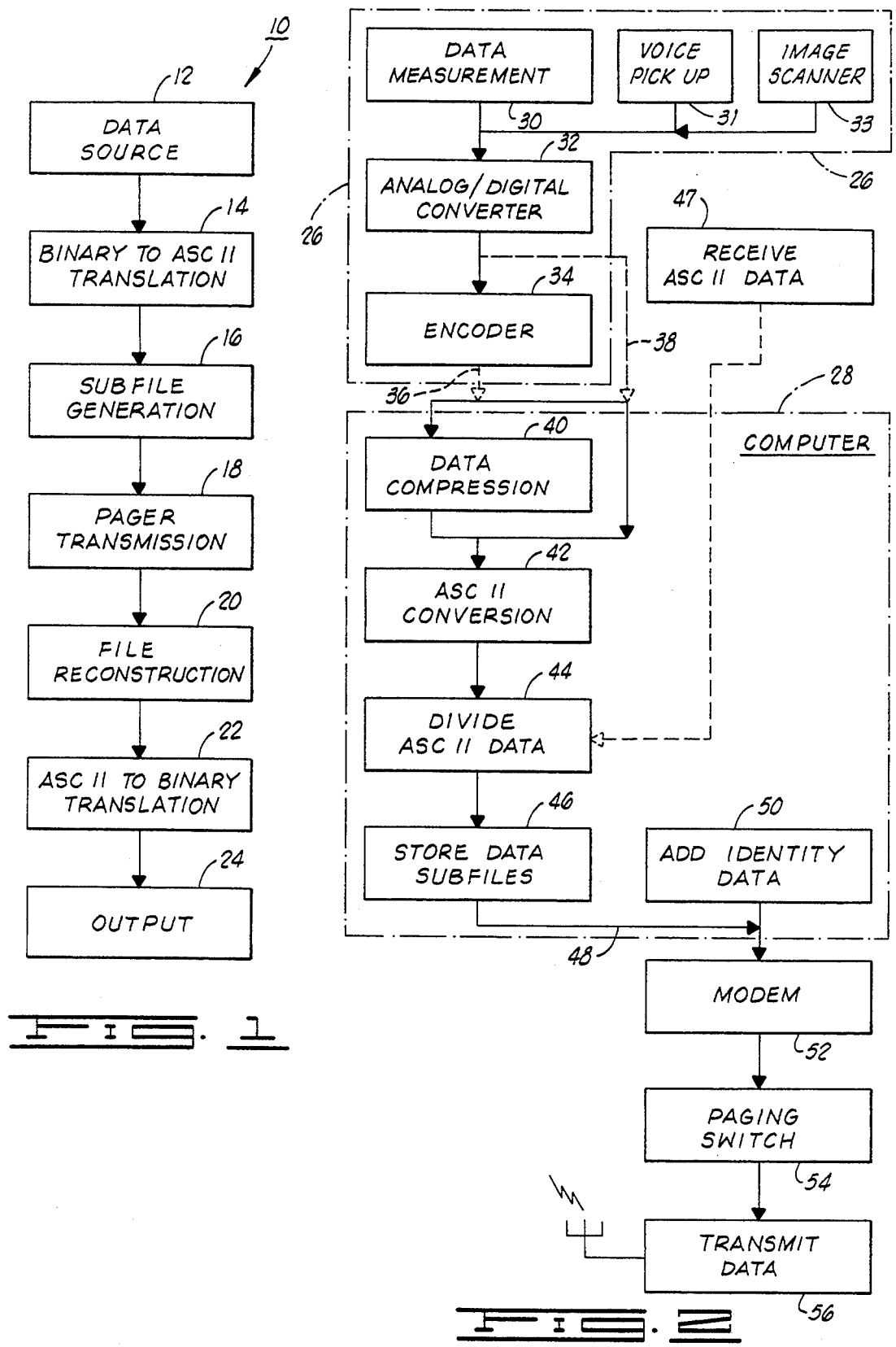

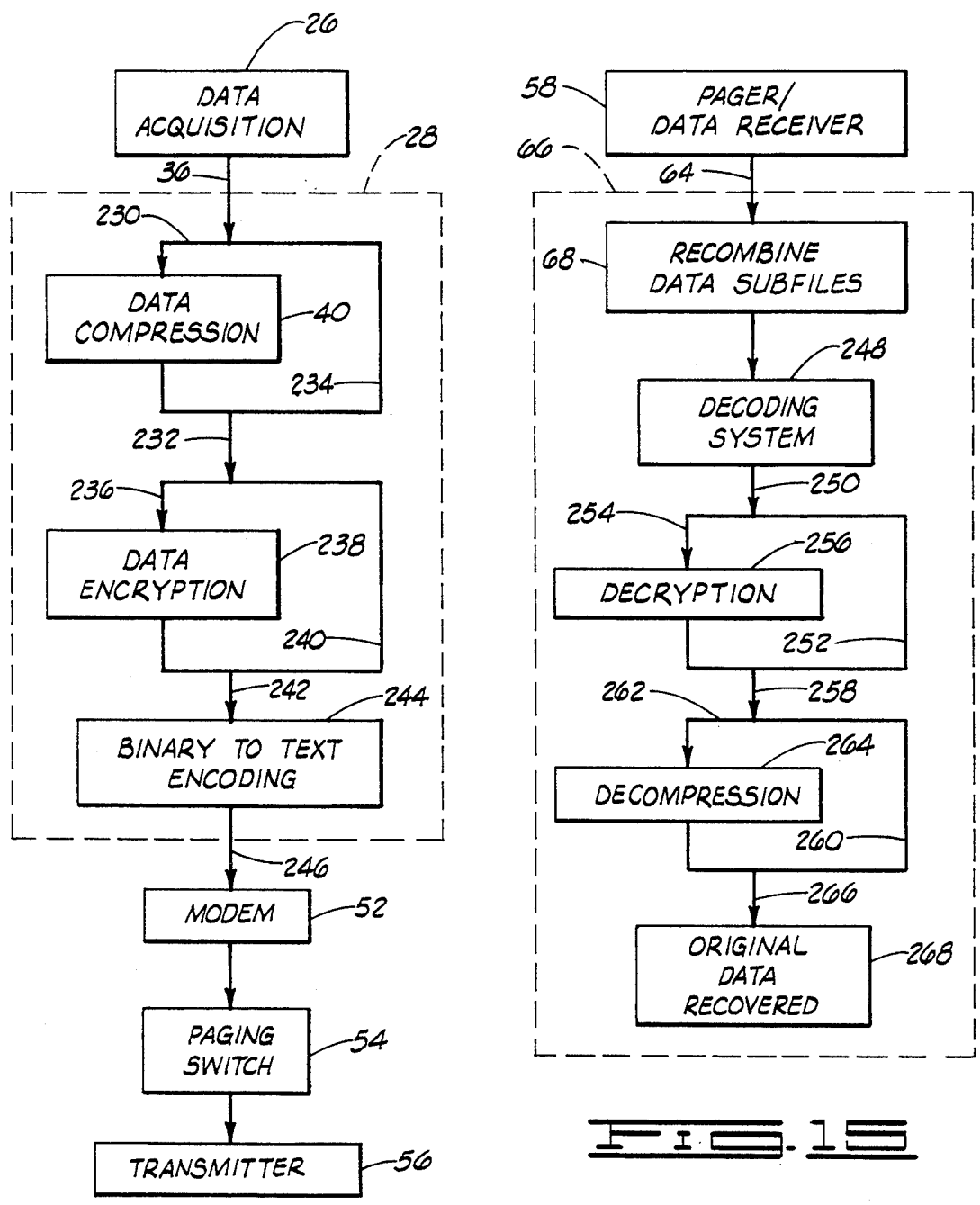

PAGING TRANSMISSION SYSTEM

This application is a continuation-in-part of U.S. application Ser. No. 08/015,869 filed on Feb. 10, 1993 and entitled "PAGING TRANSMISSION SYSTEM".

BACKGROUND OF THE INVENTION

1. Field of the Invention

The invention relates generally to paging transmission systems and, more particularly, but not by way of limitation, it relates to an improved method of paging transmission which conveys text, coded matter and/or pictorial data with maximum message content for reception and reproduction by means of a paging-type receiver or equivalent functioning in combination with a personal computer. In essence, the method entails the initial development of the data as binary signal data with subsequent encoding as, for example, ASCII data which is then transmitted via a paging system and received for subsequent decoding and data output indication. The system includes yet another level of encoding by enabling an additional custom code encryption for augmenting secrecy.

2. Description of the Prior Art

There have been many prior attempts at collection and compression of data for subsequent transmission to transmit maximum amounts of data in compressed or bandwidth reduced form, with subsequent reception at remote locations using receivers of limited size and data reproduction capabilities. This has been particularly evident from the various attempts at transmitting electrocardiogram (ECG) information for subsequent data analysis and diagnosis. One such approach to the storage and transmission of ECG data is disclosed in a paper entitled *A New Data Compression Algorithm for Computerized ECG Signal* by Walter H. Chang and C. D. Kao which appeared in IEEE/8th Annual Conference of the Engineering in Medicine and Biology Society, pages 311–314, under copyright in 1986. This paper is specifically related to transmission of ECG data and the method of doing so utilizing signal compression using the Huffman Minimum Entropy Coding Method to attain increased data reduction ratio. This method succeeded in transmitting and retrieving ECG data of twelve leads per patient along with a 30 second rhythm strip record and other pertinent data; however, the system required a mass of storage medium and an inordinate amount of time to deal with such a large amount of data, even when reduced by data compression.

Current paging systems carry minimal information for reception and indication at remote positions; however, this information carrying capacity is extremely limited. Any attempt to transmit extensive data or text messages by the present day national paging system hook-ups, i.e., EMBARK (Motorola) or SKYTEL (MTEL), would be cost prohibitive without extensive alterations to the transmit/receive systems.

SUMMARY OF THE INVENTION

The present invention relates to improvements in coding and transmitting message data for reception by a pager device having data storage and downloading capability in combination with a digital computer. More particularly, the device employs software controlling both transmission and reception of data to enable reduction of complex, multifaceted information to a transmittable data form with subsequent reception of the data through a paging system receiver for intermittent download, decoding and recomposition of the data through an associated computer. In essence, data from a selected source is converted to binary code and then translated into an alphanumeric code and, if the data message is of sufficient length, the alphanumeric code data is divided into sequential sub-files which are then presented to a paging switch in succession for transmission. The transmitted data is received by a paging receiver with sub-file storage, and the data is downloaded to an associated palmtop computer for file reconstruction and subsequent alphanumeric code to binary translation for reproduction of the data message information.

The total secrecy of the transmission system is increased and reinforced by the addition of a custom code encryption which adds yet another level of encoding. The coded source text or data is encrypted in the source computer in accordance with a custom code of specific type and application (for example, the National Bureau of Standard, Data Encryption Standard (DES)). Upon reception at a paging receiver, the encrypted and coded data is conducted to an associated computer (e.g., palmtop) which carries out decryption and decoding of the message text for display presentation.

Therefore, it is an object of the present invention to provide a paging transmission system that is capable of transmitting complex data to a remote position for reception by a paging receiver to enable reconstitution of the complex data for usage, observation, etc.

It is also an object of the present invention to provide an improved paging transmission system that has large volume information capability.

It is yet further an object of the invention to provide novel computer software for increasing the function and capability of existing pager transmission hardware.

Finally, it is an object of the present invention to provide a relatively simple and reliable paging transmission system that is capable of rapidly transmitting various forms of data including medical data, digitized image data, speech, radar indication, seismic data and actually any data that is capable of being sensed and reduced to binary data form.

Other objects and advantages of the invention will be evident from the following detailed description when read in conjunction with the accompanying drawings which illustrate the invention.

BRIEF DESCRIPTION OF THE DRAWINGS

FIG. 1 is a broad function block diagram illustrating the crux of the present invention;

FIG. 2 is a block diagram showing the transmitting portion of the paging transmission system;

FIG. 6 is a program flow diagram for providing electrocardiograph data acquisition for the present transmission system;

FIG. 14 is a block diagram showing an alternative form of paging transmission system; and FIG. 15 is a diagram of an alternative form of paging receiver combination.

DETAILED DESCRIPTION OF THE INVENTION

Figure 3:
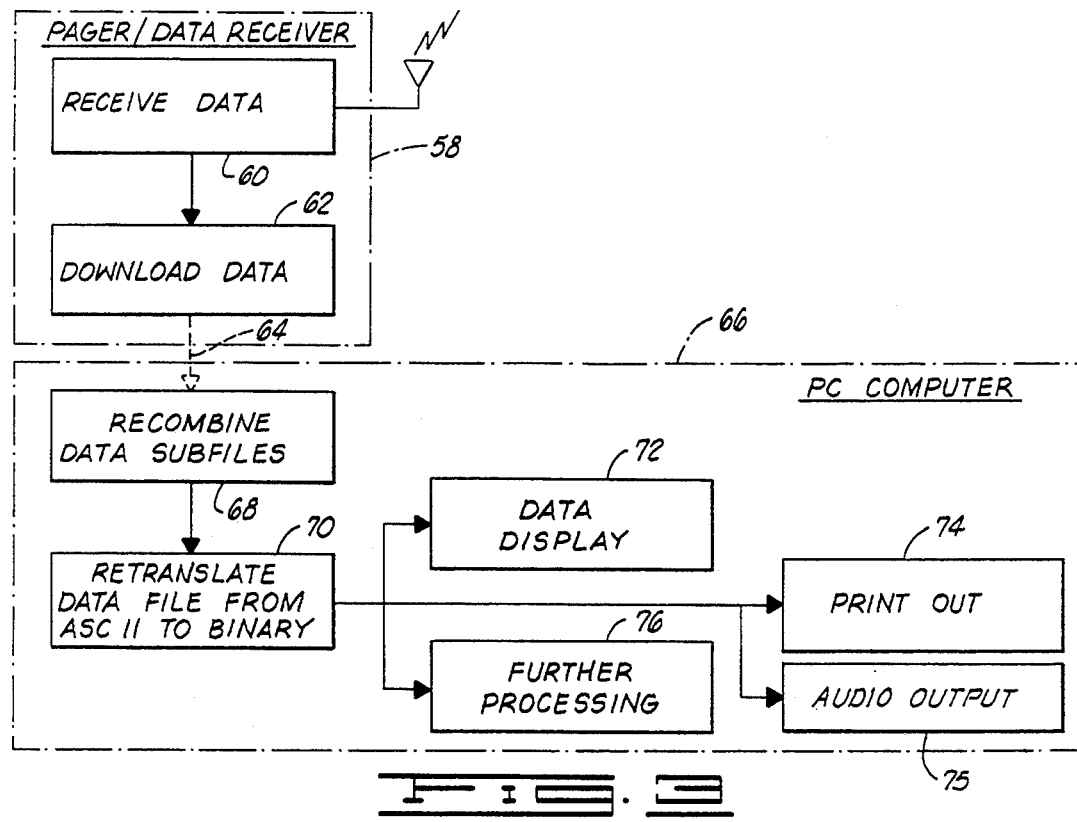
FIG. 3 is a block diagram showing the receiving portion of the paging transmission system.

FIG. 1 illustrates the basic paging transmission system 10 in its broad process steps. The data source 12 may represent any form of real world data that is measurable and susceptible of being embodied as a sequential binary coded signal. While the paging transmission system 10 has been specifically adapted to the transmission of ECG signals, as indicated by the various drawing and flow chart designations; it should be understood that data source 12 may produce any of various forms of message, i.e., text, pictorial or graphic data material and there is virtually no limitation as to the type and length of subject matter. For example, some benefits that business users may enjoy include the ability to receive wireless information such as: (1) messages and electronic mail; (2) voice mail notification; (3) data base information; (4) updates sent directly into appointment and phone book files, worksheets, calendars, to-do lists and memos; pictorial and graphic data; and (5) travel information including flight data, car and hotel arrangements, etc.

The data source 12 provides output indication of its data content to a stage 14 where the data, already in binary coded form, is translated into a 7-bit ASCII code format (plus start and parity bits) that is compatible with all standard forms of paging system. If the message length requires, the 7-bit ASCII coded data may then be divided into sequential sub-files in generation stage 16. The maximum size of the sub-files is only limited by the storage capacity of the paging receiver, as will be further described, and the number of sequential sub-files to be transmitted is virtually unlimited.

The use of ASCII coded data is specified herein because that code is provided for by the Telocator Alphanumeric Protocol (TAP) which has been adopted as standard by the United States central paging terminal manufacturers association for input of numeric, alphanumeric, or tone only pages sent from a binary output device to a central paging terminal. Thus, while ASCII is referred to in the specification and drawings, it should be understood that other recognized five and seven unit codes (e.g., IBM Transceiver Code, CCITT 5 Code, EBCDIC Code and others) may be substituted with proper allowance in the system programming.

The successive sub-files from generation stage 16 are then transmitted via modem and the standard Telocator Alphanumeric Protocol to the paging switch for transmission at pager transmission stage 18. A single phone line connection will place the sub-file data at the paging switch for transmission. Thus, a single personal computer and appropriate software converts binary data into 7-bit ASCII format, and divides into sub-files if necessary, whereupon the data is transmitted via pager transmission 18.

A pager receiver then receives the data in ASCII format, with or without sub-file sequence, via wireless transmission for subsequent pre-processing and connection via RS-232 or other form of data connector interface to a standard form of computer. In this case, a laptop or even more miniaturized palmtop computer with adequate storage is desirable, and the computer is programmed to carry out file reconstruction at stage 20 wherein all received and stored data sub-files are sequentially downloaded to the computer and reordered into proper ASCII message format. At stage 22, the ASCII code or other code sequence is translated to a binary signal sequence which is then conducted to output 24 for conversion to text, voice, pictorial output, or other message embodiment.

This message sequence is carried out by the standard type of paging system transmitter coupled with a computer that prepares the data through the binary signal to ASCII code conversion with sub-filing sequence as the software can control. Thereafter, the receiving pager is preferably one having some portion of internal storage and which is connectable via RS-232 or other data connector to a palmtop computer. As an example, the receiver may consist of a Motorola NewsStream ™ paging receiver coupled with a Hewlett-Packard palmtop computer, Type HP95LX. While this paging receiver/palmtop combination is especially desirable for use in the paging transmission system 10, it is by no means indispensable because any of a number of paging receivers and palmtop computers can be compatible for functioning in accordance with the method of the present invention.

Referring now to FIG. 2, the transmission portion of paging transmission system 10 is illustrated in greater detail. A data acquisition system 26 functions to gather the basic data for conversion into binary code format (either 8, 12, or 16-bit data) for input to a control computer 28 at the transmitting station. The data measurement stage 30 may consist of some form of data sensor and readout, along with a voice pickup 31 and image scanner 33 or the like, which provides signal output to an analog to digital converter 32 that provides digital output to an encoder 34. Encoder 34 then translates the data to a binary code format which may be output at connection 36 by either RS-232 hardline connection, wireless or other line connection as input to computer 28. Optionally, measured data permitting, encoder 34 may be bypassed with direct input of data on lead 38 either into data compression stage 40 or into ASCII conversion stage 42. In either case, the data eventually gets converted to a prescribed code format, e.g., ASCII, at stage 42 and, if necessary, the ASCII data is divided down in divide stage 44 for storage as data sub-files in storage 46. Still another option is for the data to be initially received in ASCII format from stage 47 and applied directly to divide stage 44.

Stored data sub-files 46 are then read out on line 48, and any identity data is added at stage 50 as the data sequence is input to a standard modem 52. The data message is then input via modem 52 to the paging switch 54 for subsequent transmission by transmitter 56 at the requisite paging transmission system frequencies and modulation.

Referring to FIG. 3, the transmitted pager information is then received at the pager receiver 58 as indicated at stage 60 and the data is downloaded at stage 62 for input via connection 64 to a computer 66, for example the Hewlett-Packard Type HP95LX palmtop computer. The connection 64 may be by any of several modes, as will be further described, which are made possible currently by using the Type HP95LX in combination with the Motorola NewsStream ™ data receiver. At present, the paging receiver used is the Motorola Type A05KQC4373AA having a frequency range of 929-932 MHz and a total memory size of 32K bytes.

In palmtop computer 66, the data connection 64 applies downloaded ASCII data and stage 68 functions to recombine the data sub-files into proper sequence. Stage 70 then retranslates the data file from ASCII format to binary signal data which is then compatible for output to any of data display 72, printout 74, further processing 76 and/or audio output 75.

Figure 4:
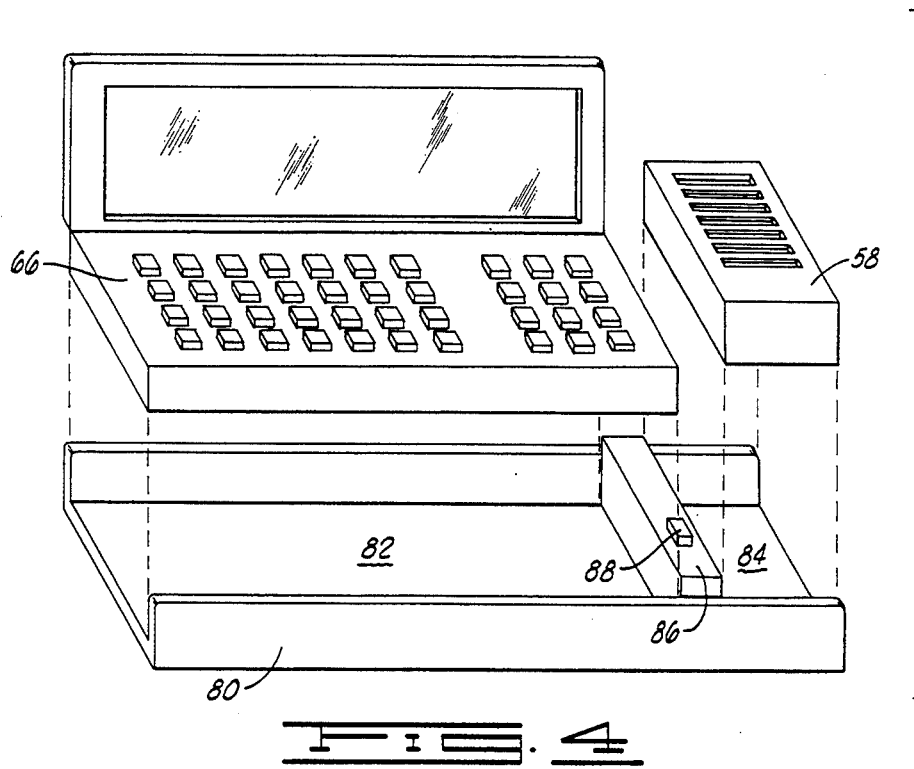
FIG. 4 is one form of paging receiver/palmtop computer that is suitable for use in the present invention.

FIG. 4 shows a present form of compatible combination of pager/receiver 58 and palmtop personal computer 66. A special portability holder 80 is formed with left and right channels 82 and 84, respectively, and these are divided by a bar 86 which includes a release button 88 and feed through connector type RS-232 (not shown). The Type HP95LX palmtop computer 66 is lockable within channel 82 and the paging receiver 58 (NewsStream ™ type) is lockably received in channel 84 as a feed-through connector (not shown) makes proper connection between the two units. The computer 66 and paging receiver 58 are also releasible so that they may be separately deployed, and the NewsStream ™ paging receiver includes up to 32k of storage so that it can receive and hold messages for subsequent engagement in holder 80 to download its contents to the associated computer 66.

Figure 5:
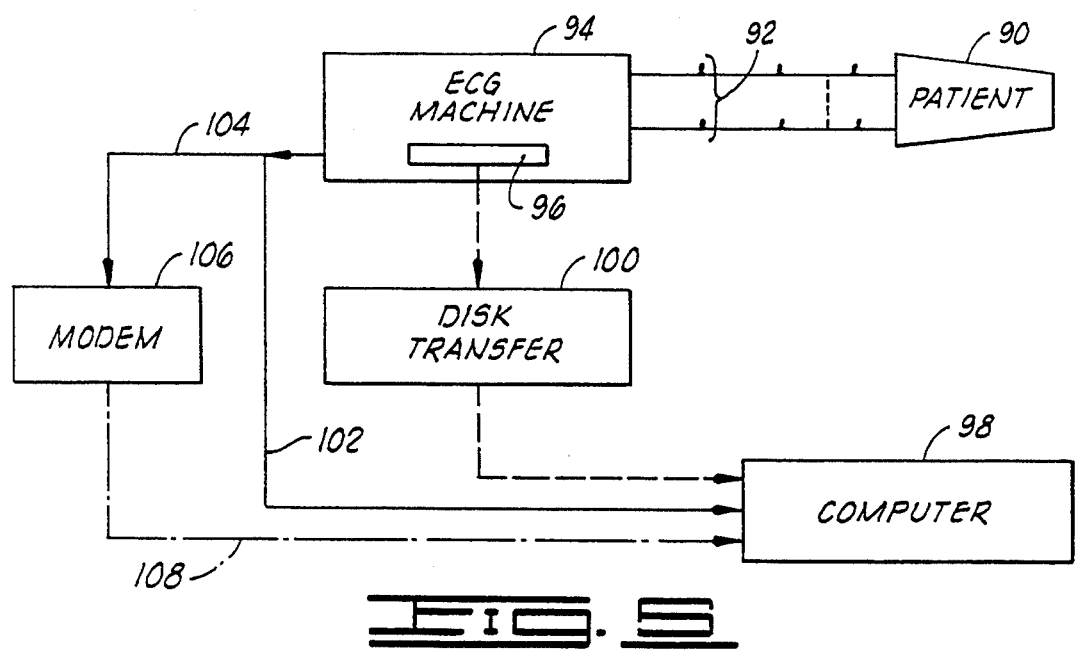
FIG. 5 illustrates one example of electrocardiograph data acquisition system that is suitable for use with the present invention.

FIG. 5 illustrates the situation wherein the present paging transmission system is employed for transmission of electrocardiogram (ECG) information. Thus, a patient 90 is connected by a multiple of sensing wires 92 (usually ten) for input to a standard type of ECG machine 94. The ECG machine 94 includes a binary data conversion stage as well as a slot 96 for receiving a floppy disk such that previously recorded ECG information may be conducted variously to an output computer 98. The output from ECG machine 94 may be recorded on the floppy disk in slot 96 so that disk transfer function 100 will place the disk in computer 98 in readiness for readout. Second, the ECG data may be directly applied by wire connection 102 for input to the associated computer 98; or third, the output from ECG machine 94 may be via phone line connection 104 to a modem 106 which transmits the ECG data via phone connection 108. The computer 98 then may further process the data to an ASCII form for connection through a modem 52 and paging switch 54 (FIG. 2) whereupon the ECG data is transmitted via wireless link.

The program controlling the unique function of the above-described hardware is set forth in the following figures as will be described. The description proceeds relative to use of the invention in an ECG surveillance and reporting mode; however, it should be understood that the paging transmission system will find use in very many modes of business activity. FIG. 6 illustrates a start point in the paging transmission system transmitter for the case wherein ECG data is to be processed. At process start, the flow indicates initialization as variables, constants and arrays are initialized at stage 110, the memory for ECG data is allocated at stage 112 and the graphics system is initialized at stage 114.

Proceeding in FIG. 6, the flow steps bracketed by 116 all relate to initial setup of the transmission station digital computer 28 (FIG. 2) for receiving the ECG input data. Thus, lead selection alignment and x-axis data allotment are created for each of the multiple leads of ECG data, in the normal case twelve lead data. Flow stage 118 then functions to load the raw ECG data into the computer memory and the raw data is filtered if necessary in stage 120. If data quality permits, the filter stage 120 can be bypassed via flow line 122 and processed through a next optional flow stage 124 wherein the ECG data is decimated with consideration of the sampling frequency. That is, the second optional stage 124 allows pre-examination of the data and a choice to throw out certain redundant or unnecessary data points thereby to reduce the overall data; or, flow stage 124 can also be bypassed with information on flow line 122 being applied directly to the flow stage 126 to display the twelve lead ECG wave forms on the data screen.

Figure 7:
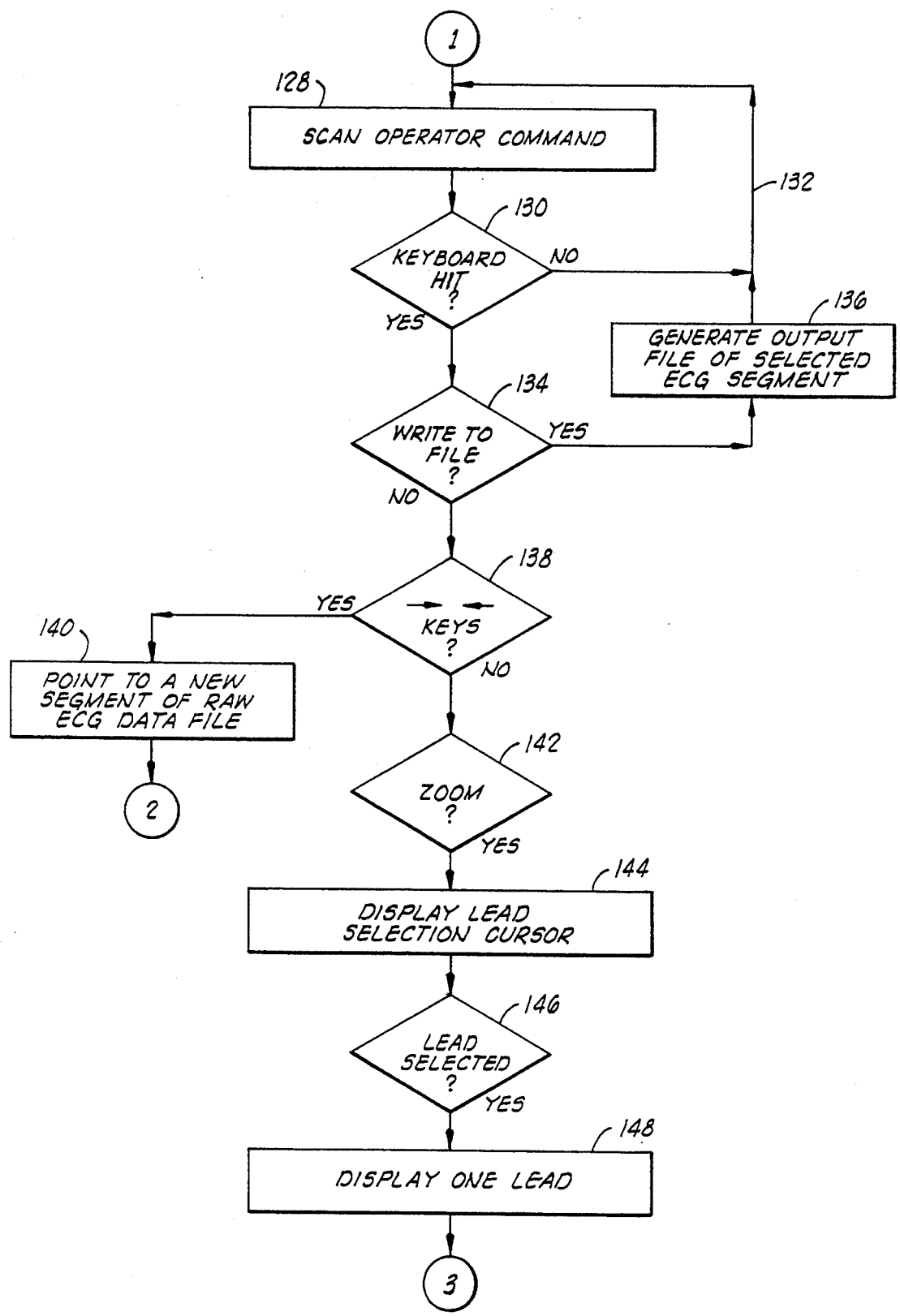
FIG. 7 is the program flow diagram succeeding FIG. 6.

Program flow then proceeds to FIG. 7 and flow stage 128 which implements scanning of the individual ECG data wave forms as a series of decision stages are effected. Stage 130 queries as to whether or not the keyboard is hit and if not the output is via flow line 132 back for recycle through the scan operator command stage 128. If decision stage 130 shows affirmative then flow proceeds to decision stage 134 which queries whether or not the data is to be written to file. If affirmative, then the output file for selected ECG data segment is readied at flow stage 136 and data operation flow recycles on line 132 for scan of the next successive operator command in flow stage 128. If the write to file question shows in the negative, then flow proceeds to decision stage 138 to determine whether or not there is a match between the selected ECG segment and the arrow designators. If affirmative, flow proceeds to stage 140 and the arrows align with a new segment of raw ECG data files. If negative, the zoom operation is selected in stage 142 to display the respective lead selection cursor and, when the lead is selected at decision stage 146, the process stage 148 displays the selected lead of ECG data. Returning to flow stage 140, when a new segment of raw ECG data is pointed, the flow recycles to FIG. 6 and the input No. 2 to the flow stage 118 to load additional raw ECG data into memory, which data relates to the new segment. The new segment of data is then passed through the optional flow stages 120 and 124 or in bypass on flow line 122 for display as one of the multi-lead ECG wave forms on the screen at flow stage 126.

Figure 8:
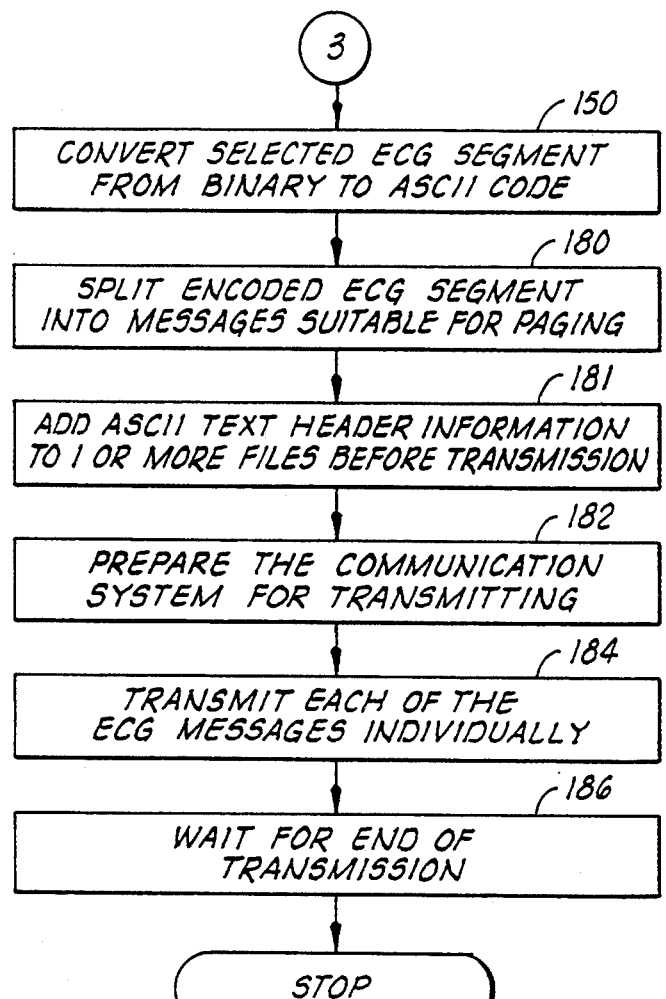
FIG. 8 is the program flow diagram succeeding FIG. 7 and controlling final data transmission.
Figure 8:
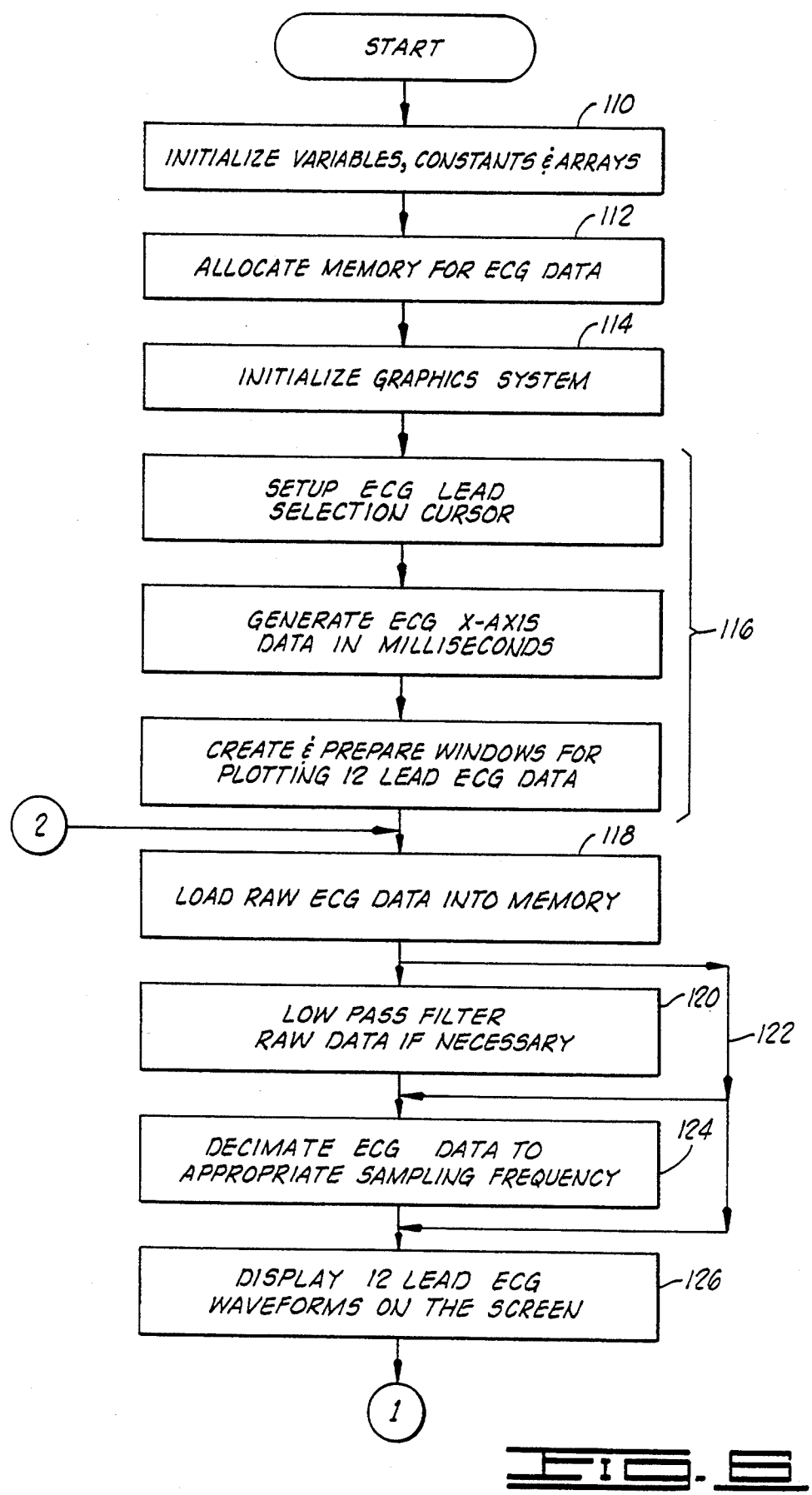
Figure 9:
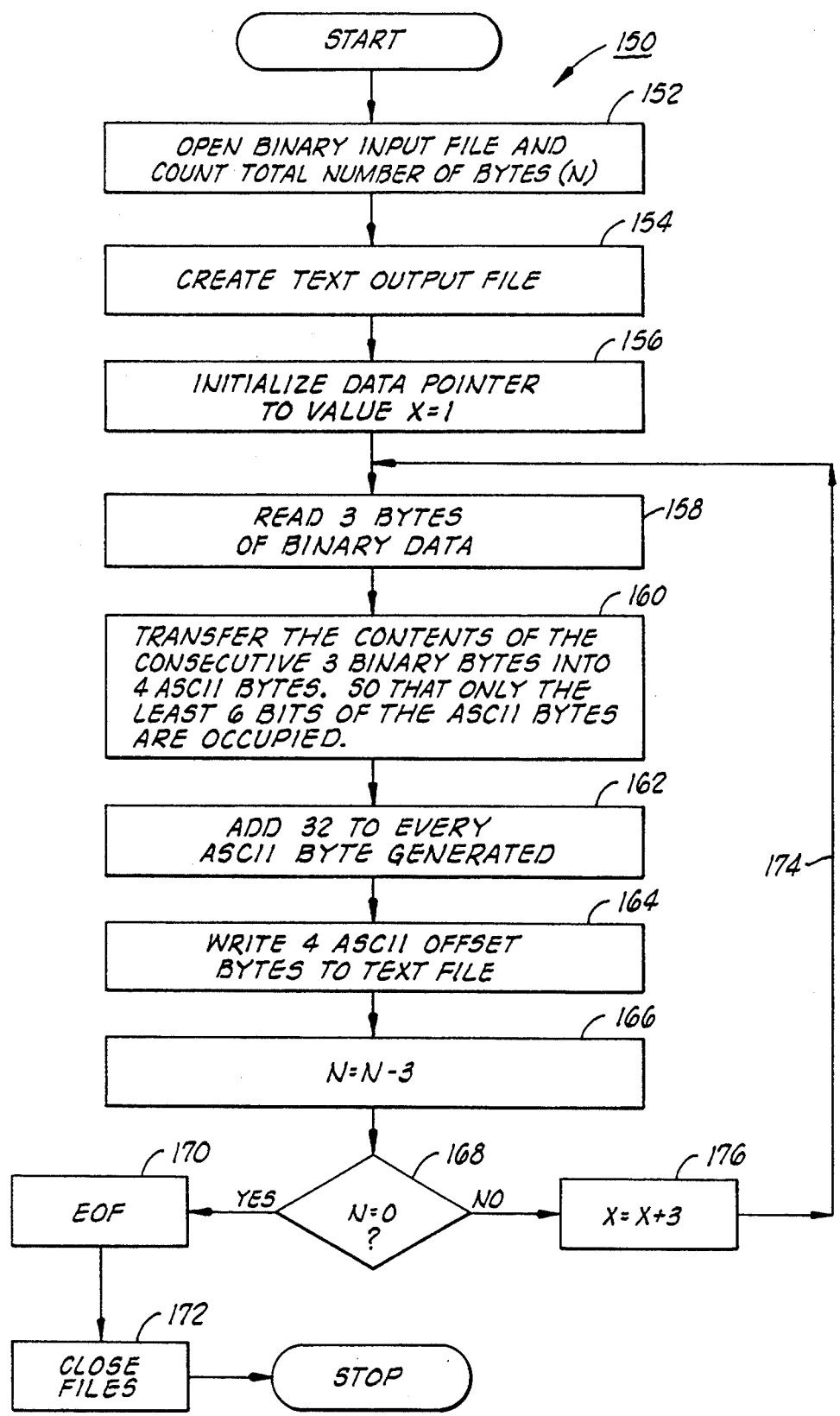
FIG. 9 is a program flow diagram for the encode operation set forth within the flow diagram of FIG. 8.

From flow stage 148 of FIG. 7, the operation proceeds to FIG. 8 and interconnect No. 3 to a flow stage 150 which converts the selected ECG data segments from binary to ASCII code data. The program for encoding the selected ECG segment of stage 150 is shown in greater detail in FIG. 9. Thus, the encode function starts with reading of the binary input file and counting of the total number of bytes (N) at flow stage 152 and creation of text output file at stage 154. The program initializes a pointer (X) at a value of X=1 at stage 156. Flow stage 158 then reads the (X) to (X+2) bytes of binary data from the binary input file.

Flow stage 160 then transfers the contents of the consecutive three binary bytes into four ASCII bytes at byte positions (X) to (X+3) so that only the least six bits of the ASCII bytes are occupied. In flow stage 162 the function is to add 32 to every ASCII byte generated and in stage 164 the 4 resulting offset ASCII bytes are written to the text file. Flow stage 166 then sets N=N−3 and a decision stage 168 queries for correct data content. If data content is correct then affirmative indication to end of file stage 170 will proceed to close files stage 172. If, at decision stage 168, the N=0 query is negative, flow recycles via line 174 for reentry to flow stage 158 after the value of X is incremented X=X+3 at stage 176. The program then again transfers the contents of the next consecutive 3 binary bytes into 4 ASCII bytes thereby occupying only the least six bits of the ASCII bytes. When all multi-lead ECG data has been encoded, affirmative output from end of file decision stage 172 effects closing of files at 174 to stop the encoding process.

The software for encoding (FIG. 7) and decoding (FIG. 13) the pager transmission data is included herewith as:

Exhibit 1: PC Software; and
Exhibit 2: HP95LX Software.

Returning again to FIG. 8, the flow stage 180 functions to split the encoded ECG segment data in the form of ASCII code into messages that are suitable for paging. That is, messages that have proper content for sequential passage through the transmission system without overloading receiver storage. A transmitted file may contain not only the twelve lead ECG data but also important information as to the patient's age, sex, blood pressure and other pertinent history. The total data file is sub-divided into separate sub-files for transmission, the exact number and size of the files to be determined by the program limits of the paging system. Each of the sub-files contains some redundant information in order to deal with inevitable transmission errors. For instance, the phone number of the particular emergency room is sent in each sub-file and can be reconstructed on an error-free basis even if all files are sent with data corruption. This feature allows a receiving cardiologist to call the sending emergency room to request a re-transmission of the ECG data, if necessary. At flow stage 182, the paging transmission system is prepared to transmit the ECG data. Then, in flow stage 184 the ECG messages are each individually transmitted in sequence until end of transmission is signified at flow stage 186.

Figure 10:
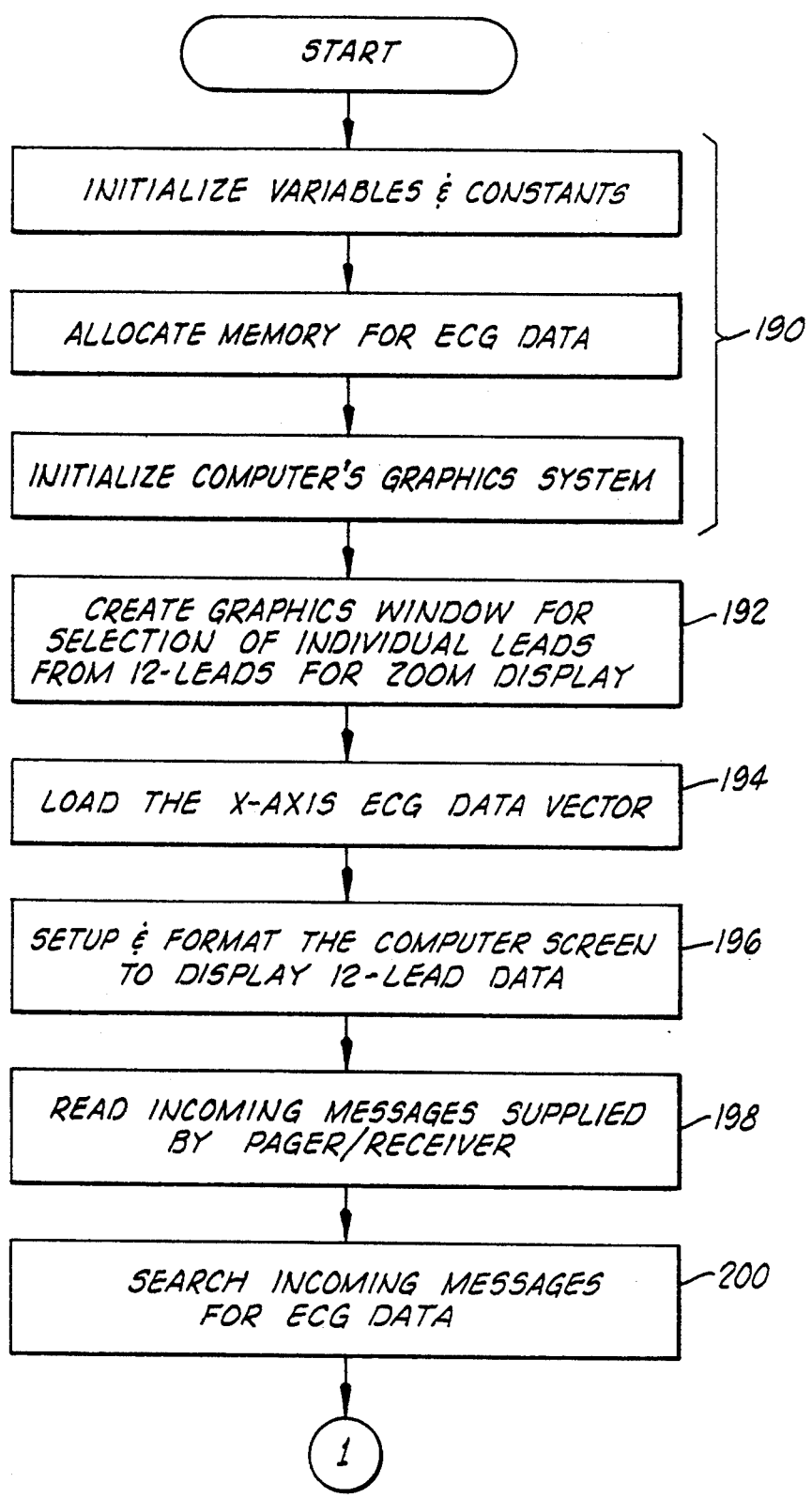
FIG. 10 is the flow diagram for the first part of the software for receiving, decoding, displaying and analyzing received electrocardiograph data.
Figure 11:
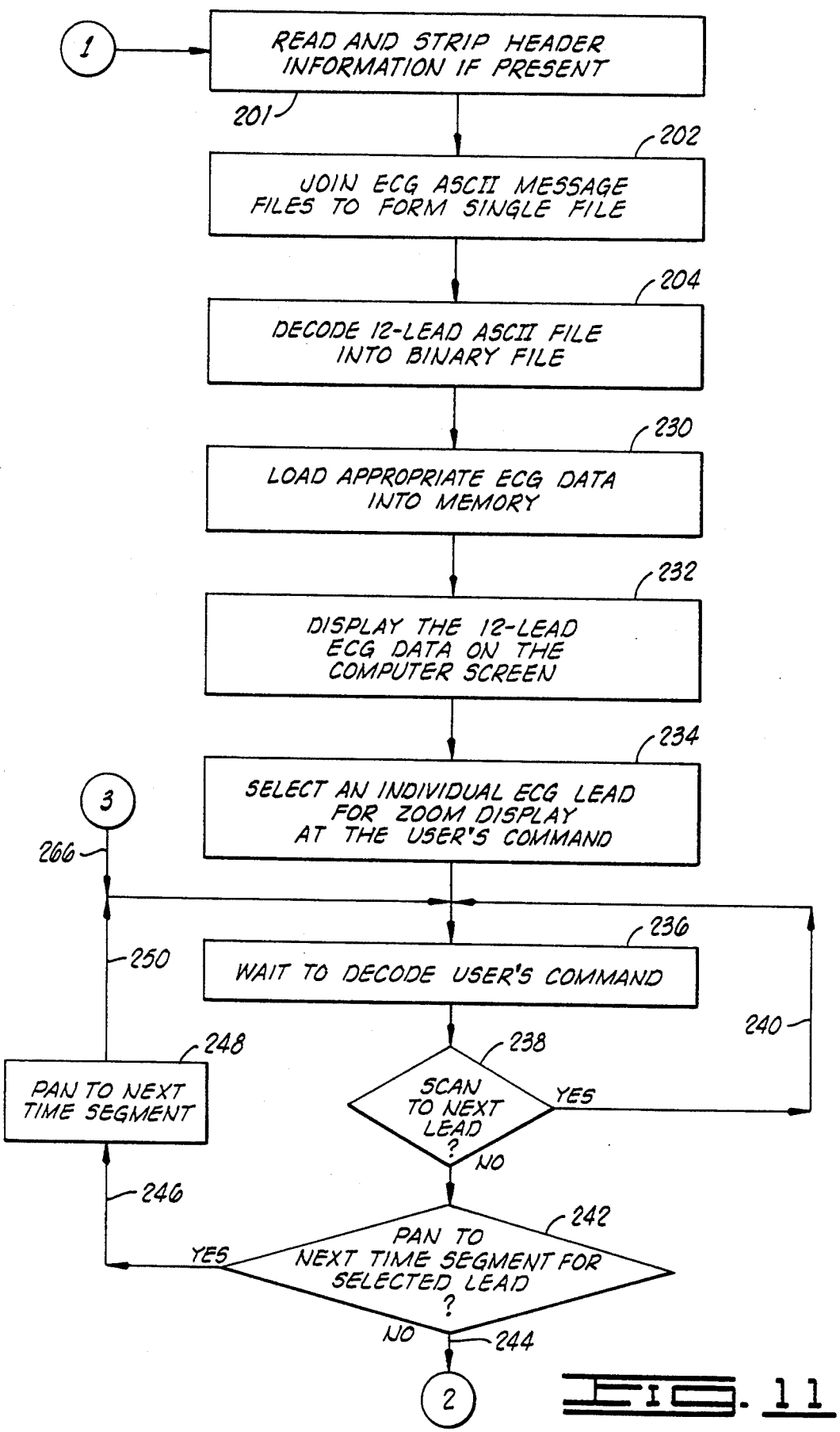
FIG. 11 is a portion of flow diagram succeeding that of FIG. 10.
Figure 12:
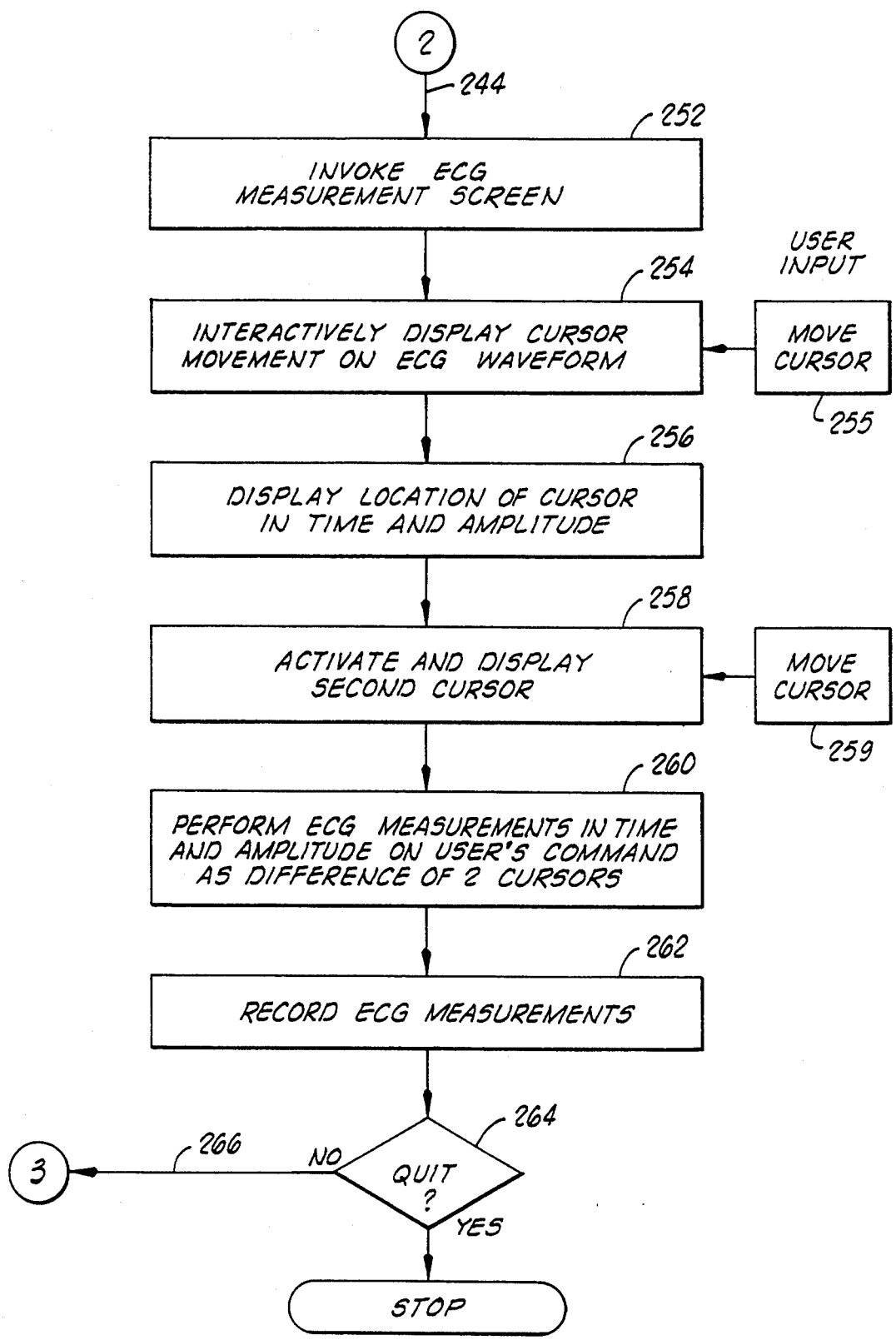
FIG. 12 is a third succeeding portion of flow diagram relating to the receiving function.

The flow diagram of FIGS. 10, 11 and 12 illustrate the operation at the paging receiver 58 and computer 66 (FIG. 3). In FIG. 10, the flow stages within bracket 190 indicate initialization of variables and constants, allocation of memory for received ECG data (a single file) and initialization of the associated graphics system. The display graphics are created in flow stage 192 as the twelve-lead ECG data can be selectively presented and flow stage 194 sees to the X-axis data vector placement. The computer screen is properly set up and formatted for twelve-lead data at stage 196 and incoming messages are read at stage 198 for search at stage 200 to detect any incoming ECG data messages.

Figure 13:
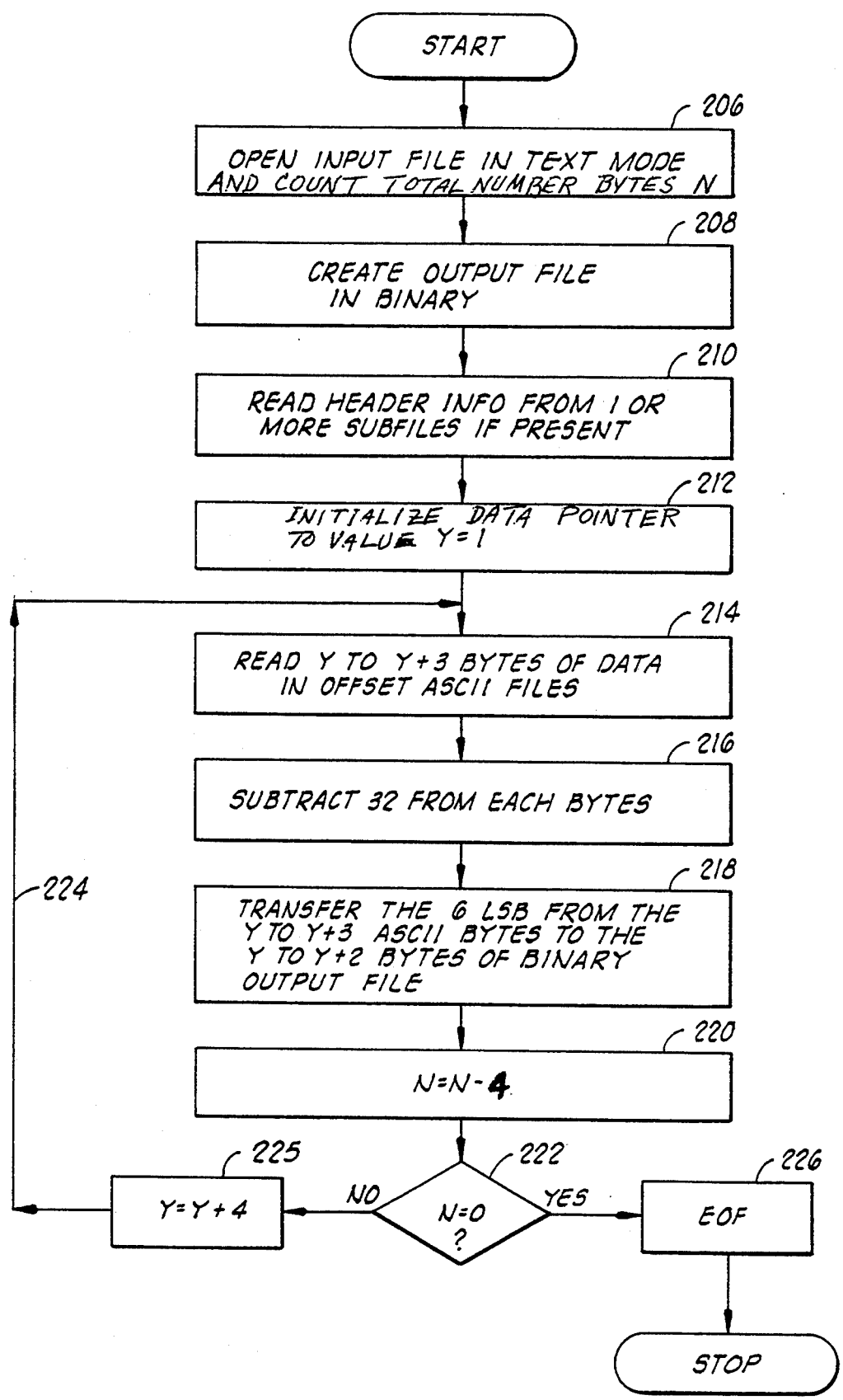
FIG. 13 is a flow diagram for the decode operation as set forth in FIG. 11.

Referring to FIG. 11, the program proceeds to flow stage 202 wherein the successive sub-file messages are joined to form the complete message, if in fact more than a single sub-file was required. Thus, the ECG ASCII message code files are formed into a single file. Thereafter, this single file message is decoded in flow stage 204 as illustrated in FIG. 13. The process of FIG. 13 is essentially the reverse of the encode routine of FIG. 9. In FIG. 13, decoding commences with opening of an input file in the text mode at flow stage 206, counting of the total number of bytes N, and subsequent creation of a binary mode output file at stage 208. Any header information is read and removed from the recombined ASCII file at stage 210, and a data file pointer Y is initialized to Y=1 at stage 212. Stage 214 effects reading the Y to Y+3 bytes of encoded data. Stage 216 sees a subtraction of a value of 32 from each ASCII offset byte thereby creating new ASCII bytes.

In flow stage 218, three binary bytes are generated for every 4 ASCII bytes that are read by increasing to eight the number of binary bits that are occupied by the least significant six bits of ASCII bytes. Flow stage 218 writes the binary bytes to a binary file. Process stage 220 then sets N=N−4 as flow proceeds to decision stage 222 to test for N=0. If negative, flow recycles to flow stage 214 to process the next 4 bytes of data. If decision stage 222 queries affirmative, then it proceeds to declare end of file at stage 226 and the decoding process stops.

Referring again to FIG. 11 the decoded binary file data is loaded into ECG data memory at flow stage 230, and flow stage 232 displays the 12-lead ECG data on the computer screen. That is, the graphics screen 72 of the portable computer 66 (see FIG. 3). The attendant operator may then select an individual ECG lead for enlarged zoom display, an inherent and necessary function for the diagnostics usage. The user's command from flow stage 234 is decoded in flow stage 236 and flow stage 238 queries as to whether or not to scan to the next lead. If affirmative, flow line 240 recycles to stage 236 to decode user's command, and if decision stage 238 is negative, then flow moves to decision stage 242 to pan the data to the next time segment that relates to a selected lead. Upon decision, negative response moves to interconnect No. 2 via flow line 244, and affirmative response on flow line 246 effects panning to the next time segment at stage 248 with recycle flow via line 250 to flow stage 236 and a wait for decoding of user's command.

Referring to FIG. 12, flow line 244 proceeds to flow stage 252 to bring in the ECG measurement screen, and flow stage 254 enables interactive display of cursor movement on the ECG waveform in response to the user input moving the cursor key 255. Flow stage 256 provides indication of cursor location in time and amplitude subject to flow stage 258 and the interactive second cursor 259 movement. ECG measurements in time and amplitude are effected in flow stage 260 and recorded as at flow stage 262. Decision stage 264 then queries as to whether the process should end and, if affirmative, it proceeds to stop.

If decision stage 264 tests negative, then process proceeds by flow line 266 to input interconnect No. 3 on FIG. 11. The recycle input from interconnect No. 3 is to the flow stage 236 to wait for decoding user's command. Thus, decision stage 238 selects a next ECG waveform or time segment thereof for processing through the measurement program of FIG. 12, i.e., the flow stages 252–262 and so on until decision stage 264 signifies quit or cease processing.

In operation, the present paging transmission system offers increased advantage in those situations where a significantly large amount of text, graphic, voice or combination data must be transmitted to an authoritative or diagnostic person or persons in order to obtain a clarification or instruction to proceed. For example, in the case of ECG information, a patient may be disposed in an emergency room with continual ECG data being recorded while the attending cardiologist or medical doctor is at a remote location during either leisure hours or work activity at a different location. It is only necessary that the doctor have with him the combination paging receiver 58/palmtop computer 66 such as illustrated in FIG. 4.

The method of the present invention is capable of sending, receiving and displaying physiologic data of both textual and graphic type. The system can transmit all forms of ECG data including 12-lead ECG data, signal averaged data, transtelephonic rhythm strip data, Holter monitor data and direct connect or telemetered rhythm strip data. Various other forms of physiologic data such as fetal monitoring, End Tidal $CO_2$ data, Pulse Oximetry data, Cardiac Output data, etc. may be transmitted using the present method.

Data may be obtained directly from a patient via a medical diagnostic or monitoring device for digitization and binary encoding into code form compatible with the paging transmission system utilizing the standard TAP protocol. The transmitted data may include any graphic data such as waveforms, X-rays, depictions etc. while also including alphanumeric text data identifying patient's name, any demographic and/or clinical patient data, telephone number and location or ER from which data is being sent, as well as data check number of files, rank of each subfile, number of characters per subfile, etc. An error detection scheme may be included such as a three-digit checksum to identify continually each data subfile transmitted. Also, it is important to include the source telephone number in each subfile so that a redundancy test will always allow reconstruction of the correct source telephone number, and thence the source location, even with missing or corrupted subfile data.

In the event of a problem or other emergency indication detected at the emergency room, the appropriate data can be measured, digitized and encoded in the ASCII code for transmission via modem to the paging switch 54 and transmitter 56 (FIG. 2). The real world data may include such as multi-trace (12 lead) ECG data, one or more lead monitored rhythm strips, signal averaged ECG waveform, high resolution waveform data, pacemaker and other patient data. The diagnostic information is transmitted in sufficient detail to enable diagnosis of acute myocardial infarction as well as many cardiac diseases, the diagnosis of arrhythmias and the causal ischemia, the diagnosis of a risk of ventricular tachycardia, as well as pacemaker function and other heart or circulatory related activity.

No matter how remote the doctor's location within the transmission area, his paging receiver 58/computer 66 (FIG. 4) will take over in the manner of FIG. 3 to receive the data for download to the computer 66. If the total volume of data exceeds the storage capacity of the pager data receiver 58 (32K bytes) as would usually be the case with ECG waveform and textual data, then data download stage 62 is effected in several increments of storage and download to the PC computer 66. Computer 66 then recombines the ASCII code data sub-files in succession to put together the total ECG message data which is then retranslated in stage 70 to a binary coded form for replay through any of data display 72, a printout 74, or some designated further processing 76.

It should be understood that more often than not there will be a situation where the binary file is converted to ASCII code data which is then subjected to the ASCII sub-file division and subsequent reconstruction. However, there is available an alternative in programming choice where the initial binary file undergoes the sub-file division and generation, and then is converted from binary to ASCII code form. If this option is selected, the program must accommodate computation and reservation of sufficient storage space for the ASCII data, or to select some designated minimum amount of storage space.

The paging transmission system as set forth in FIGS. 2 and 3 has been particularly described with respect to medical data transmission; however, there are a great many other commercial applications wherein the paging transmission system can be utilized. For example:

(1) Sending WordPerfect® (and other word processing) documents to a mobile computer for editing and printing (e.g., customizing quotes, orders, contracts, etc.) at a site using the latest "template" from the home office.

(2) Sending Lotus 123 and other spreadsheets to a mobile computer in the manner described above.

(3) Sending digitized image matter to a mobile computer (e.g., sending pictures of homes that fit a particular buyer directly to a realtor in the field).

(4) Sending voice mail directly to individuals no matter where they are.

(5) Police use wherein a central dispatcher can continually disseminate various graphic and textual data relating to suspect identity, missing persons, etc.

These are only five of a great number of applications wherein the paging transmission system of the present invention may be utilized to good advantage.

FIGS. 14 and 15 illustrate an alternative application of the invention wherein an extra level of encoding is allowed for secrecy purposes since maximum message security is of the essence. Thus, in many official applications, e.g., secret transmission of government or law enforcement messages, defense documents, and many other areas of governmental and industrial communications, it is necessary to have utmost secrecy as maintained by proprietary or custom codes that are rigidly controlled by the using entity. The present paging system contemplates the inclusion of such custom codes by providing yet another level of encryption in the paging transmission/paging reception and signal processing scheme. In addition to generation of binary data representative of given text, and subsequent translation of binary data to ASCII data for pager transmission and reception, the system now provides for options of data decompression and/or data encryption for the transmission process. Selected equipment at the paging receiver/computer can then decompress and/or decrypt the data as required to deliver the final text message.

Referring to FIG. 14, the transmission equipment includes the same data acquisition stage 26 which may include an image scanner 33, voice pick up 31 or other data generator, all of which operate into an analog/digital convertor 32 (see FIG. 2). Output from the analog/digital convertor 32 is via encoder 34 which produces binary coded output signals on lead 36 for input to the computer 28. The data on lead 36 may be applied optionally to a lead 230 to data compression stage 40 and then via lead 232 to the next succeeding stage. Data compression stage 40 functions to save computer storage space by eliminating empty fields, gap redundancies, or unnecessary data thereby to reduce the size or overall length of records. Optionally, data compression stage 40 can be by-passed via lead 234.

Binary signal on lead 232 is then presented with another option where (1) the signal can proceed via lead 236 to data encryption stage 238 which converts the signal to the custom code variation, or (2) the binary signal may be applied to the by-pass lead 240 for input via lead 242 to the binary to text encoding stage 244. The binary to text encoding 244 is actually the proprietary coding of the transmission system as set forth with respect to FIG. 2. That is, the compressed and/or encrypted binary data on lead 242 is applied through such as the ASCII conversion stage 42 (see FIG. 2) for subsequent division of the ASCII data in stage 44 and storage of the data in subfiles as at stage 46. Any identity data may be added at this point and the encrypted ASCII data is applied on a line 246 to modem 52, paging switch 54 and transmitter 56, as in the FIG. 2 embodiment.

Transmitter 56 then transmits the signal with binary data encoded in accordance with the system text encoding plus an additional level of encryption in accordance with the selected custom code as applied at encryption stage 238. The data compression at stage 40, data encryption at stage 238, and the binary to text proprietary encoding at stage 244, are carried out under control of the computer 28 and suitable programming software for each of the stages is resident within the source computer 28. The custom codes, many of which will be readily available for use, may be programmed directly into the storage files of computer 28. Alternatively, the text message, as it is present in ASCII code form within the binary to text encoding stage 244, may be applied to an encryption stage utilizing a commercially available algorithm that carries out the encryption just prior to the operation of dividing the coded text material into subfiles.

The code transmission is received by a suitable pager receiver 58 as shown in FIG. 15, and the coded data may be downloaded via line 64 for recombination into the data subfiles as shown at stage 68. This is the same basic function that takes place in the primary embodiment as shown in FIG. 3. The recombined code data from stage 68 (within computer 66) is then applied through a decoding system 248 which functions to retranslate the coded data file from ASCII data form to a coded binary signal form with output via lead 250.

Depending upon pre-designated options, the data flow may be via by-pass line 252 or line 254 to decryption stage 256. The decrypted data on line 258 then proceeds to a next successive option, either to conduct the decrypted data via by-pass line 260 or, if the data requires decompression, by line 262 for input to a data decompression stage 264. The decryption stage 256 functions to decode the custom coded binary signal data as present on lead 254. The binary signal data is finally output on line 266 and then proceeds to original data recovery stage 268 where, similar to FIG. 3, the binary data is applied for data display, printout, further processing, etc.

The palmtop computer 66 carries out all of the functions for recombining data files as at stage 68, as well as for decoding, decryption and decompression until finally recovering the original data at stage 268. The custom code decryption software controlling operation of stage 256 is resident within the unit storage of computer 66, a preferred form being the Hewlett-Packard palmtop computer, Type HP95LX.

The foregoing discloses a novel paging transmission system having characteristics of speed of transmission and portability per volume of data delivered that have heretofore been unknown in the art. By converting measured real world data to ASCII data code for transmission via a standard paging transmitter, a user is able to receive considerably greater volumes of data at a remote location by using a paging receiver/palmtop computer combination which has the capability of sequentially receiving sub-file divided ASCII data for recomposition into the whole length message in binary form for deriving the message information indication.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method for transmitting selected data that is encrypted with a custom code from a source position to a remote position, comprising:
   generating said selected data as digital binary data at the source;
   encrypting said binary data in accordance with the custom code;
   converting the custom code encrypted data to alphanumeric code data and dividing into at least one successive sub-files, each of preselected maximum message size;
   transmitting the divided, encrypted alphanumeric code data via a paging switch;
   receiving the encrypted alphanumeric code data via paging receiver at the remote position;
   downloading the encrypted alphanumeric code data to a personal computer which recombines the at least one sub-files;
   decoding the encrypted alphanumeric code data to encrypted binary data;
   decrypting the encrypted binary data to generate binary data; and
   displaying said binary data in original selected data form.

2. A method as set forth in claim 1 wherein said step of transmitting comprises:
   applying the encrypted alphanumeric code data through a modem to the paging switch to transmit the alphanumeric code data.

3. A method as set forth in claim 1 wherein:
   said alphanumeric code data is ASCII code data.

4. A method as set forth in claim 1 wherein the step of downloading further includes:
   recombining the encrypted alphanumeric code data sub-files in the personal computer thereby to reconstruct the total encrypted selected data.

5. A method as set forth in claim 4 wherein said step of transmitting comprises:
   applying the encrypted alphanumeric code data through a modem to the paging switch to transmit the alphanumeric code data.

6. A method as set forth in claim 1 which further includes the steps of:
   compressing the digital binary data prior to the step of encrypting; and
   decompressing the binary data after the step of decrypting.

7. A method for transmitting paging data that is encrypted with a selected custom code from a source to a remote position, comprising:
   deriving said paging data at the source as binary data;
   encrypting the binary data in accordance with the custom code;

encoding the encrypted binary data to ASCII code data;

transmitting the ASCII code data via an alphanumeric paging system;

receiving the ASCII code data at the remote position;

downloading the ASCII code data to a personal computer which decodes to the encrypted binary data; and decrypting the encrypted binary data for output indication of the paging data.

8. A method as set forth in claim 7 wherein said step of receiving includes:

receiving by means of an alphanumeric paging receiver with internal storage and storing the ASCII code data.

9. A method as set forth in claim 8 which is further characterized to include:

dividing the ASCII code data into plural sub-files, each no larger than the paging switch internal capacity, before transmitting; and transmitting the respective ASCII code data sub-files in sequential order.

10. A method as set forth in claim 9 which is further characterized to include:

receiving the successive ASCII code data sub-files and downloading each in sequential order to the personal computer; and decoding the total ASCII code data to provide the paging data output indication.

11. A method as set forth in claim 10 wherein:

said paging data is alphanumeric data.

12. A method as set forth in claim 7 wherein said paging data is alphanumeric data.

13. A method as set forth in claim 7 which further includes the steps of:

compressing the binary data prior to the step of encrypting; and decompressing the binary data after the step of decrypting.

14. A paging system for transmitting selected data encrypted with a custom code to a remote location, comprising:

means for deriving the selected data in binary signal form;

means for encrypting the binary signal form to custom coded binary signals;

means for translating the custom coded binary signals to ASCII code data;

a paging switch for receiving the ASCII code data and transmitting the data;

a paging receiver for receiving the ASCII code data and storing for subsequent download of data;

means receiving the download data and retranslating the ASCII code data to said custom coded binary signals;

means for decrypting said custom coded binary signals to generate binary signal data; and means for processing the binary signal data to provide output indication of the selected data.

15. A paging system as set forth in claim 14 wherein said means for translating comprises:

means for converting the custom coded binary signals from binary to ASCII code; and means for dividing the ASCII code signals into a plurality of sub-files of predetermined file size for sequential input to said paging switch.

16. A paging system as set forth in claim 14 wherein said means receiving comprises:

means for receiving the successively downloaded sub-files of ASCII code data; and means for retranslating the successive sub-files of ASCII code data to produce the full message custom coded binary signal data.

17. A paging system as set forth in claim 14 wherein said means for deriving comprises:

means for generating a first output indicative of selected data; and means for producing the first output in binary digital signal form.

18. A paging system as set forth in claim 17 wherein said means for translating comprises:

means for converting the custom coded binary digital signals to ASCII code data; and means for dividing the ASCII code data into a plurality of sub-files of predetermined file size for sequential input to said paging switch.

19. A paging system as set forth in claim 18 wherein said means receiving comprises:

means for receiving the successively downloaded sub-files of ASCII code data;

means for retranslating the successive sub-files of ASCII code data to produce the full message custom coded binary signal data; and means providing output indication of the full message binary signal data.

20. A paging system as set forth in claim 14 which further includes:

means for compressing said selected data in binary signal form prior to input to said means for encrypting; and means for decompressing said binary signal data output from said means for decrypting.

* * * * *